July 3, 1923.

A. E. THOMPSON

POWER TRANSMITTING DEVICE

Filed April 2, 1921

1,460,622

Inventor
Arthur E. Thompson

By
Sturtevant & Mason Attorneys

Patented July 3, 1923.

1,460,622

UNITED STATES PATENT OFFICE.

ARTHUR E. THOMPSON, OF UTICA, NEW YORK, ASSIGNOR TO UNION SPECIAL MACHINE COMPANY, OF CHICAGO, ILLINOIS, A CORPORATION OF ILLINOIS.

POWER-TRANSMITTING DEVICE.

Application filed April 2, 1921. Serial No. 458,008.

*To all whom it may concern:*

Be it known that I, ARTHUR E. THOMPSON, a citizen of the United States, residing at Utica, in the county of Oneida, State of New York, have invented certain new and useful Improvements in Power-Transmitting Devices, of which the following is a description, reference being had to the accompanying drawing and to the figures of reference marked thereon.

The invention relates to new and useful improvements in power transmitting devices, and more particularly to a power transmitting device of the type shown in the patent granted to Dudley S. Seymour May 21, 1907, No. 854,671.

An object of the invention is to provide a power transmitting device of the above type wherein the belt is driven directly from the driving pulley, thus eliminating the driven pulley and the possible slippage between the driving and driven pulleys, and thereby enabling the sewing machine to pick up the power quicker than heretofore.

A further object of the invention is to provide a power transmitting device wherein, when the operating part is idle, the driving belt is released from tension, thereby eliminating all unnecessary strain upon the sewing machine pulley and permitting the operator to turn the hand wheel of the sewing machine for raising or lowering the needle bar without having also to rotate a portion of the power transmitting device.

A still further object of the invention is to provide a power transmitting device of the above character which includes a rotatable part on which the belt for driving the operating part rests when the operating part is idle, and a brake which is applied to the rotatable part to stop its rotation at this time.

These and other objects will in part be obvious and will in part be hereinafter more fully disclosed.

In the drawings, which show by way of illustration one embodiment of the invention:—

Figure 1:
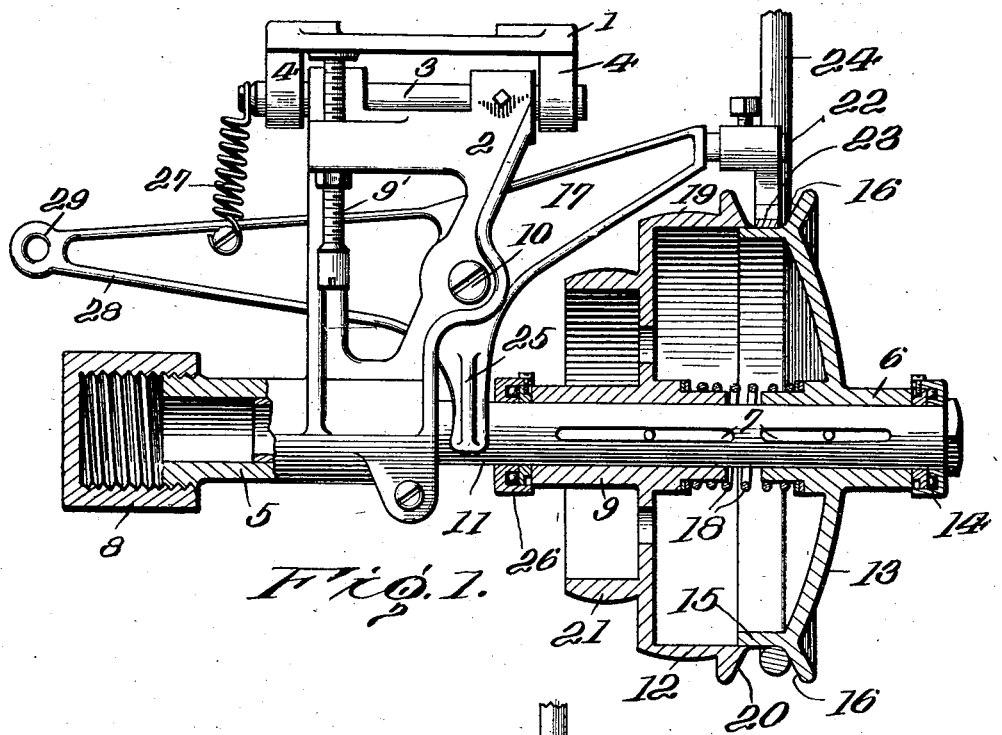
Figure 1 is a view, partly in side elevation and partly in vertical section, with the parts of the transmitting device positioned so as to be free from driving engagement with the belt.
Figure 2:
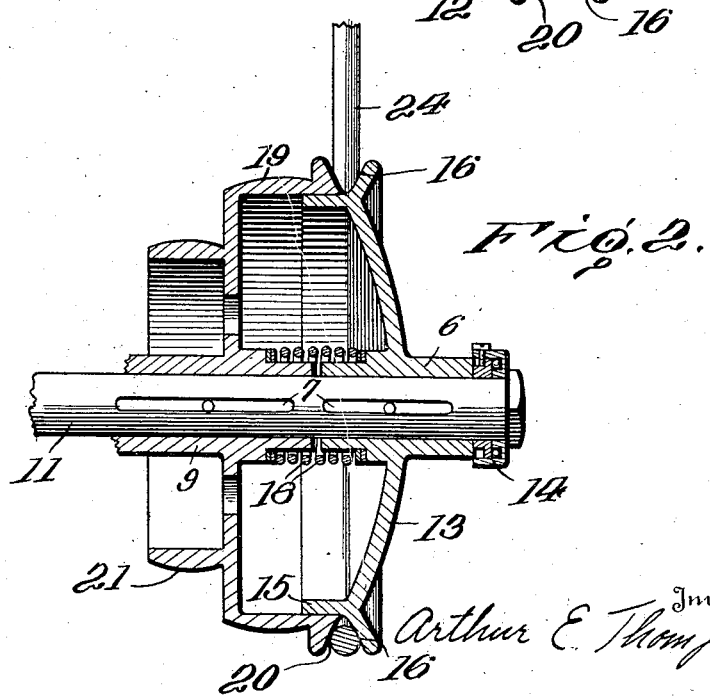
Fig. 2 is a vertical sectional view through the driving pulley and a rotatable part associated therewith, and showing these parts gripping the belt for driving the same.

The invention consists broadly in a transmitter for imparting power to an operating part, such as a sewing machine, and comprises a supporting bracket in which is mounted a shaft which is preferably fixed to the bracket so as to be held from rotation. Mounted on this shaft is a driving pulley which rotates freely on the shaft and is capable of endwise movement thereon. This driving pulley has a belt gripping flange. Associated with the driving pulley is a rotatable member also having a belt gripping flange, and this rotatable member is held from endwise movement on the shaft. Manually controlled means is provided for moving the driving pulley so as to cause the belt to be gripped between the flanges of the driving pulley and the rotatable member for driving the operating part. Underlying the gripping flanges is a cylindrical member carried by the rotatable member on which the belt rests when it is free from the gripping flanges. The diameter of this cylindrical member is such that, when the belt is free from the gripping flanges, it is released from tension. Brake means is also provided for engaging the rotatable member for stopping the same when the belt is released.

Referring more in detail to the drawings, my improved transmitter consists of a supporting base 1 which is preferably attached to the underside of a table on which the part to be operated is carried. My transmitter is especially adapted for use in connection with a sewing machine, and the supporting base 1 is secured to the underside of the sewing machine table.

Mounted on said supporting base is a depending bracket 2 which is secured to a supporting shaft 3 mounted to rotate in bearings 4—4. Said depending bracket 2 is provided with a sleeve 5 at its lower end in which is mounted a shaft 11, said shaft being clamped to the sleeve. Said sleeve 5 is hollow so that grease may be placed in the hollow sleeve. The shaft is hollow also, and is provided with slots 7—7 through which the grease may be distributed to the rotating parts hereinafter described. An end cap 8 threaded on the end of the sleeve closes the opening in the sleeve. Adjustable screws 9′ serve as a means for swinging the bracket 2 to properly position the transmitter. These parts are similar to those shown in the Seymour patent above referred to, and further description thereof is not thought necessary.

Mounted on the shaft 11 is a driving pulley 12 and a rotatable member 13. On the end of the shaft is a cap 14. The rotatable member 13 is carried by a hub 6 which rotates freely on the shaft 11, and this hub bears against the end cap 14 which prevents endwise movement of the rotatable member 13 on the shaft. The driving pulley 12 is free to move endwise on the shaft and also freely rotates on the shaft 11. The driving pulley is moved to the left, as viewed in Fig. 1, by means of the spring 18. This spring is coiled about portions of the hub 6 which supports the rotatable part 13 and portions of the hub 9 which supports the driving pulley, said spring bearing against shoulders on the hubs normally tends to separate the driving pulley from the rotatable member 13.

A lever 17 is pivoted at 10 to the depending bracket 2. Said lever has a depending forked arm 25 which straddles the shaft 11 and bears against a collar 26 which in turn bears against the end of the hub 9. The arm 25 is moved to the left, as viewed in Fig. 1, by means of a spring 27 which is secured at one end of the shaft 3 and at the other end of the arm 28 of the lever 17. The treadle or knee shift is connected to the outer end 29 of the arm 28 and is utilized for pulling down on the outer end of the arm 28 for swinging the lever 17 in a counterclockwise direction. When the lever is depressed at its outer end and moved as above noted, the forked arm 25 engages the collar 26 and this in turn moves the driving pulley to the right compressing the spring 18. On the other hand, when the lever 17 is released, the spring 18 serves to automatically return or move the driving pulley to the left.

The driving pulley 12 is preferably provided with a relative small belt wheel 21 over which the driving belt runs for operating the driving pulley and a larger belt-wheel 19. The larger belt-wheel is provided with a flange 20 having the right hand face thereof, as viewed in Fig. 1, inclining to the left from the inner to the outer face of the flange. The rotatable member 13 is provided with a cylindrical portion 15 which fits loosely within the inner face of the larger belt-wheel 19 and is formed with a cylindrical recess so that the larger belt-wheel 19 of the driving pulley may slide over the cylindrical portion 15 on the member 13. This rotatable member 13 is also provided with a flange 16 which inclines to the right from the inner to the outer face of the flange. Between the two flanges 16 and 20 is a belt 24. This belt runs over the driving pulley of the part to be operated as, for example, the hand wheel or belt wheel of the sewing machine (not shown). When the lever 17 is depressed at its outer end and the driving pulley 12 is moved to the right, the belt 24 will be moved onto the inclined faces of the flanges 16 and 20 and thus put under tension and gripped so that the rotatable member 13 will move with the driving pulley and together these members will grip and drive the belt and the belt will turn the belt or hand wheel of the sewing machine. When the flanges 16 and 20 are out of gripping contact with the belt, as shown in Fig. 1, the belt is released from tension so that it is comparatively loose and all strain is, therefore, taken off from the belt wheel of the sewing machine. Furthermore, it is often necessary or desirable to turn the hand or belt wheel of the sewing machine to raise the needle from the goods, and this can be accomplished very readily as the belt is released from tension and no part of the transmitter will be turned when said hand wheel of the sewing machine is thus turned.

On the outer end of the right hand end of the lever 17 there is a stop 22 carrying a brake shoe 23. When the lever 17 is released so that the spring 27 raises the left hand end, the belt wheel 19 by means of the spring 18 is moved away from the rotatable member 13, thus uncovering the cylindrical portion 15 and at this time the brake shoe 23 moves down into contact with this cylindrical portion 15, thus stopping the rotations of the member 13. The belt rests on this cylindrical portion 15 and as the rotations thereof are stopped, there will be no tendency of the transmitter to turn the belt when the lever 17 is released by the operator.

It will be noted from the above description that I have provided a transmitter wherein I have done away entirely with the driven member of previous transmitters with which the belt makes continuous driving connection and, therefore, I have done away with the friction clutch heretofore used between the driving pulley and the driven pulley, and to this extent I have eliminated slippage so that the sewing machine will pick up much quicker and reach full speed.

It is obvious that minor changes in the details of construction and the arrangement of parts may be made without departing from the spirit of the invention as set forth in the appended claims.

Having thus described the invention, what is claimed as new is:—

1. A power transmitter including in combination, a support, a driving pulley mounted thereon and having belt gripping devices, and manually operated means for causing said belt gripping devices to engage and drive the belt.

2. A power transmitter including in combination, a support, a driving pulley mounted thereon and having belt gripping devices, manually operated means for causing said belt gripping devices to engage and drive the belt, and spring means for freeing the belt from driving engagement with the driving pulley when said manually operated means is released.

3. A power transmitter including in combination, a driving pulley, a rotatable member, said driving pulley and rotatable member having cooperating belt gripping devices, and means for moving said driving pulley and rotatable member toward and from each other for causing said devices to grip the belt or release the belt as desired.

4. A power transmitter including in combination, a support, a driving pulley mounted thereon, a rotatable member mounted on said support, said driving pulley and rotatable member having cooperating belt gripping flanges for gripping and putting the belt under tension to cause the belt to drive an operating part, spring means for supporting the driving pulley and rotatable member to release the belt, and manually controlled means for moving the driving pulley and rotatable member relative to each other to cause the belt to be gripped and driven.

5. A power transmitter including in combination, a supporting shaft, a member mounted to rotate freely on said shaft and held from endwise movement thereon, said member having an outwardly projecting flange, a cylindrical laterally projecting portion, a driving pulley freely mounted on said shaft and capable of endwise movement thereon, said driving pulley having a cylindrical recess adapted to freely receive the cylindrical projection on said rotatable member, a spring for normally separating the driving pulley and rotatable member, said driving pulley and rotatable member having projecting flanges with faces inclining outwardly and away from each other between which the belt to be driven runs, and manually controlled means for moving the driving pulley so that the belt may rest freely on the cylindrical projection when the belt is idle and so that said belt may be gripped and driven by the inclined flanges when desired.

6. A power transmitter including in combination, a supporting shaft, a member mounted to rotate freely on said shaft and held from endwise movement thereon, said member having an outwardly projecting flange, a cylindrical laterally projecting portion, a driving pulley freely mounted on said shaft and capable of endwise movement thereon, said driving pulley having a cylindrical recess adapted to freely receive the cylindrical projection on said rotatable member, a spring for normally separating the driving pulley and rotatable member, said driving pulley and rotatable member having projecting flanges with faces inclining outwardly and away from each other between which the belt to be driven runs, manually controlled means for moving the driving pulley so that the belt may rest freely on the cylindrical projection when the belt is idle and so that said belt may be gripped and driven by the inclined flanges when desired, and a brake shoe operated by said manually controlled means and adapted to engage said cylindrical member for stopping the rotatable member when the belt is released from the driving pulley.

In testimony whereof, I affix my signature.

ARTHUR E. THOMPSON.